United States Patent [19]
Baker et al.

[11] Patent Number: 6,124,562
[45] Date of Patent: Sep. 26, 2000

[54] ELECTRODE POSITIONER FOR ELECTRIC-DISCHARGE TEXTURING APPARATUS

[75] Inventors: James W. Baker, St. Clair Shores; William J. Murphy, Saginaw, both of Mich.

[73] Assignee: Modern Hard Chrome Service Company, Warren, Mich.

[21] Appl. No.: 09/259,836

[22] Filed: Mar. 1, 1999

[51] Int. Cl.[7] .................................................. B23H 1/00
[52] U.S. Cl. .................................. 219/69.14; 219/69.15; 219/69.2
[58] Field of Search .............................. 219/69.14, 69.15, 219/69.2, 69.11

[56] References Cited

U.S. PATENT DOCUMENTS

| | | | |
|---|---|---|---|
| 4,638,141 | 1/1987 | Houman et al. | 219/69.2 |
| 5,034,589 | 7/1991 | Evans et al. | 219/69.14 |

FOREIGN PATENT DOCUMENTS

| | | | |
|---|---|---|---|
| 62-287942 | 12/1987 | Japan | 219/69.15 |

*Primary Examiner*—Geoffrey S. Evans
*Attorney, Agent, or Firm*—Brooks & Kushman P.C.

[57] ABSTRACT

An electrode positioner (24) for electric-discharge texturing apparatus (10) includes an elongated connector (62) located externally of an elongated housing (32) and extending between a servo head (40) on a slide (38) mounted by the housing and moved by a servo actuator (58). The elongated connector (62) has an internal passage (64) for carrying dielectric fluid to the servo head (40) and also has an electrical connection (60) to the servo head and an electrical connection (70) to an electrical power supply (72) to supply electrical power to an electrode supported by an electrode holder (42) on the servo head. The elongated connector (62) includes an elongated metallic tube (82) whose interior defines the passage (64) that carries the dielectric fluid and which itself carries the electrical power between the electrical connection (60) to the servo head (40) and the electrical connection (70) to the electrical power supply (72).

14 Claims, 2 Drawing Sheets

ELECTRODE POSITIONER FOR ELECTRIC-DISCHARGE TEXTURING APPARATUS

TECHNICAL FIELD

This invention relates to an electrode positioner for electric-discharge texturing apparatus for performing texturing of a workpiece surface.

BACKGROUND ART

Electric-discharge machining which is conventionally referred to as EDM has been performed for many years by generating a voltage between an electrode and a workpiece through a dielectric fluid such that a spark momentarily generated removes a portion of the workpiece surface to perform machining. This general type of machining has more recently evolved into electric-discharge texturing wherein the surface of a workpiece is textured. For example, rolls used in steel mills to roll steel that is to be painted cannot be too smooth or the paint adhesion will not be good. Texturing of the rolls provides the rolled steel with a textured surface to which paint adheres better. This texturing is performed by electric-discharge texturing apparatus wherein a bank of electrodes are moved adjacent the roll surface as the roll is rotated. Electrode positioners ensure that the electrode is properly spaced with respect to the workpiece surface so as to be close enough to generate momentary sparks through dielectric fluid but not too close so as to generate a continuous current flow without any sparks to perform the texturing operation. Electrode positioners for such electric-discharge texturing apparatus have conventionally included a housing through which an electric power is supplied to the electrode and through which a dielectric fluid is also supplied so as to be immediately located adjacent the supported electrode where a spark takes place in addition to a supply of the dielectric fluid onto the roll from above so as to generally wet the roll.

DISCLOSURE OF INVENTION

An object of the present invention is to provide an improved electrode positioner for electric-discharge texturing apparatus for performing texturing of a workpiece surface.

In carrying out the above object, an electrode positioner for electricdischarge texturing apparatus for performing texturing of a workpiece surface includes an elongated housing of a generally tubular construction having first and second ends. A slide of the electrode positioner is mounted by the housing for movement along a slide axis extending along the housing. The slide has a servo head supported thereby at the first end of the housing, and the servo head includes an electrode holder for holding an electrode used in the electric-discharge texturing of the workpiece surface. A servo actuator of the electrode positioner is mounted by the housing adjacent the second end of the housing and is operable to move the slide and the servo head with the electrode supported thereby along the slide axis toward and away from the workpiece surface. An elongated connector of the electrode positioner is located externally of the housing and extends from the servo head at the first end of the housing to the second end of the housing in a parallel relationship to the slide axis. The elongated connector has an internal passage for carrying dielectric fluid to the servo head at the first end of the housing from a dielectric fluid supply adjacent the second end of the housing. The elongated connector also has an electrical connection to the servo head at the first end of the housing and an electrical connection for connecting to an electrical power supply adjacent the second end of the housing to supply electrical power to the electrode supported by the electrode holder on the servo head.

In the preferred construction of the electrode positioner, the first end of the housing includes a mounting surface for mounting the electrode holder on the apparatus, and the electrode positioner further includes a bushing for supporting the elongated connector on the apparatus adjacent the first end of the housing for movement with respect to the housing while preventing rotation of the servo head with respect to the housing about the slide axis. The electrode positioner in addition also includes a second bushing for supporting the elongated connector on the second end of the housing for movement with respect to the housing while preventing rotation of the servo head with respect to the housing about the slide axis. Thus, the first and second bushings cooperatively prevent rotation of the servo head with respect to the housing about the slide axis.

In the preferred construction of the electrode positioner, the elongated connector includes an elongated metallic tube having an interior that defines the passage that carries the dielectric fluid to the servo head, and the elongated metallic tube carries the electrical power between the electrical connections to the servo head and the electric power supply. Furthermore, in addition to the first end of the housing including a mounting surface for mounting the electrode positioner on the apparatus, the electrode positioner also includes an electrically insulated bushing for supporting the elongated metallic tube of the elongated connector on the apparatus adjacent the first end of the housing for movement with respect to the housing while preventing rotation of the servo head with respect to the housing about the slide axis. In addition, the electrode positioner also includes a second electrically insulated bushing for supporting the elongated metallic tube of the elongated connector on the second end of the housing for movement with respect to the housing while preventing rotation of the servo head with respect to the housing about the slide axis. Thus, the first and second electrically insulating bushings cooperatively prevent rotation of the servo head with respect to the housing about the slide axis.

The preferred construction of the electrode positioner has the servo head provided with a passageway for carrying the dielectric fluid from the interior of the elongated metallic tube to the electrode supported by the electrode holder. In addition, the electrode positioner also preferably includes an electrically insulated connection that connects the servo head to the slide. Furthermore, the electrode positioner also includes a metallic connector block that is mounted by the elongated metallic tube of the elongated connector adjacent the second end of the housing and has an electrical connection for electrically connecting to the electrical power source and also has a passageway for fluid connection to the dielectric fluid supply.

In the preferred construction of the electrode positioner, the servo actuator includes an electric servo motor having a rotary output that rotates about the slide axis. The servo actuator also includes a ball screw and nut assembly rotatively driven by the rotary output of the electric servo motor and connected to the slide to provide the movement of the slide along the slide axis.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
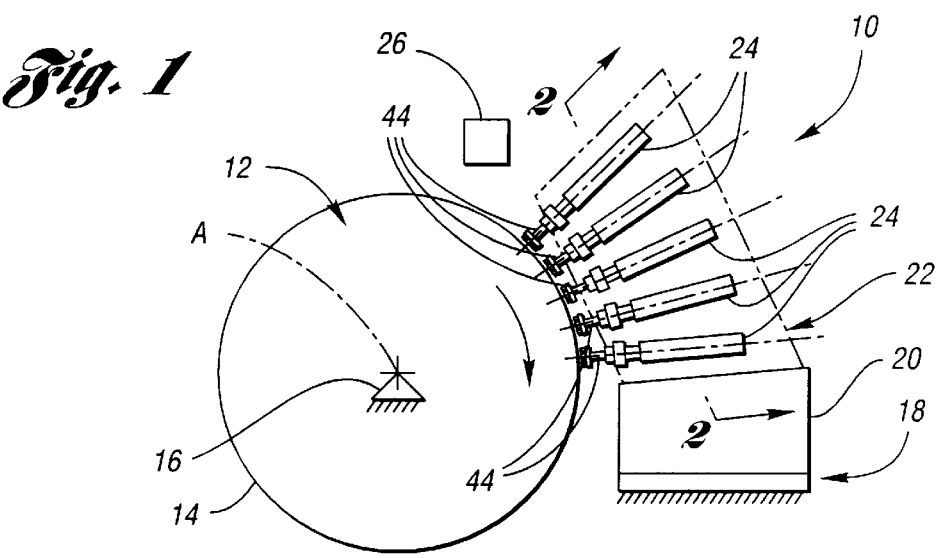
FIG. 1 is an elevational schematic view of electric-discharge texturing apparatus including a bank of electrode positioners that are each constructed in accordance with the invention to provide texturing of a roll workpiece at its outer round surface.
Figure 2:
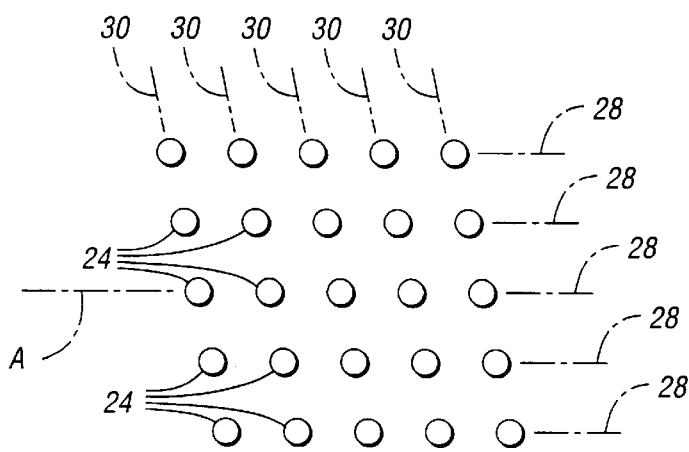
FIG. 2 is a view that is taken in a radial direction with respect to the roll workpiece along the direction of line 2—2 in FIG. 1 to illustrate the positioning of the bank of electrodes.

With reference to FIG. 1 of the drawings, apparatus generally indicated by 10 performs electric-discharge texturing of a workpiece embodied by a roll 12 having a round outer surface 14 on which the texturing operation is performed. The roll 12 is rotatably supported by supports 16 and rotatively driven about a rotational axis A during the texturing operation. A slideway 18 of the apparatus mounts a carriage 20 for movement horizontally along the rotational axis A adjacent the roll 12. A housing 22 supported on the carriage 20 mounts a bank of electrode positioners 24 that are each constructed in accordance with the present invention as is hereinafter described. At the upper side of the housing 22, a dielectric fluid supply 26 provides a supply of dielectric fluid that wets the outer roll surface 14 for the electric-discharge texturing operation. As shown in FIG. 2, the bank of electrode positioners 24 are arranged in axial rows 28 and circumferential columns 30 that are slightly inclined along the axis A of rotation so that there is a greater degree of distribution of the texturing during each rotation of the workpiece.

Figure 4:
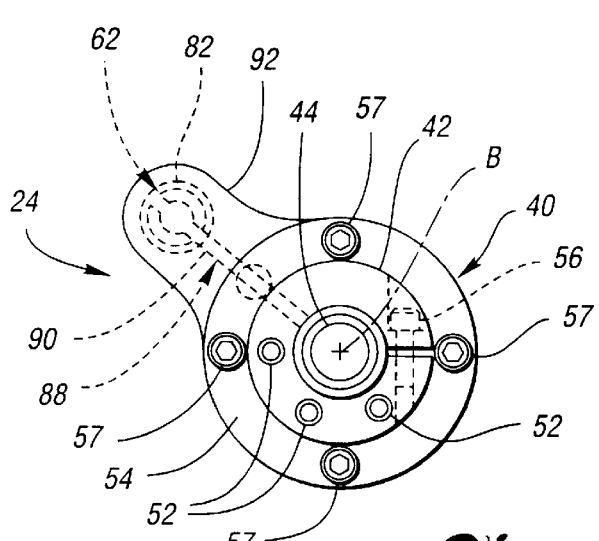
FIG. 4 is an end view of the positioner taken along the direction of line 4—4 in FIG. 3.
Figure 3:
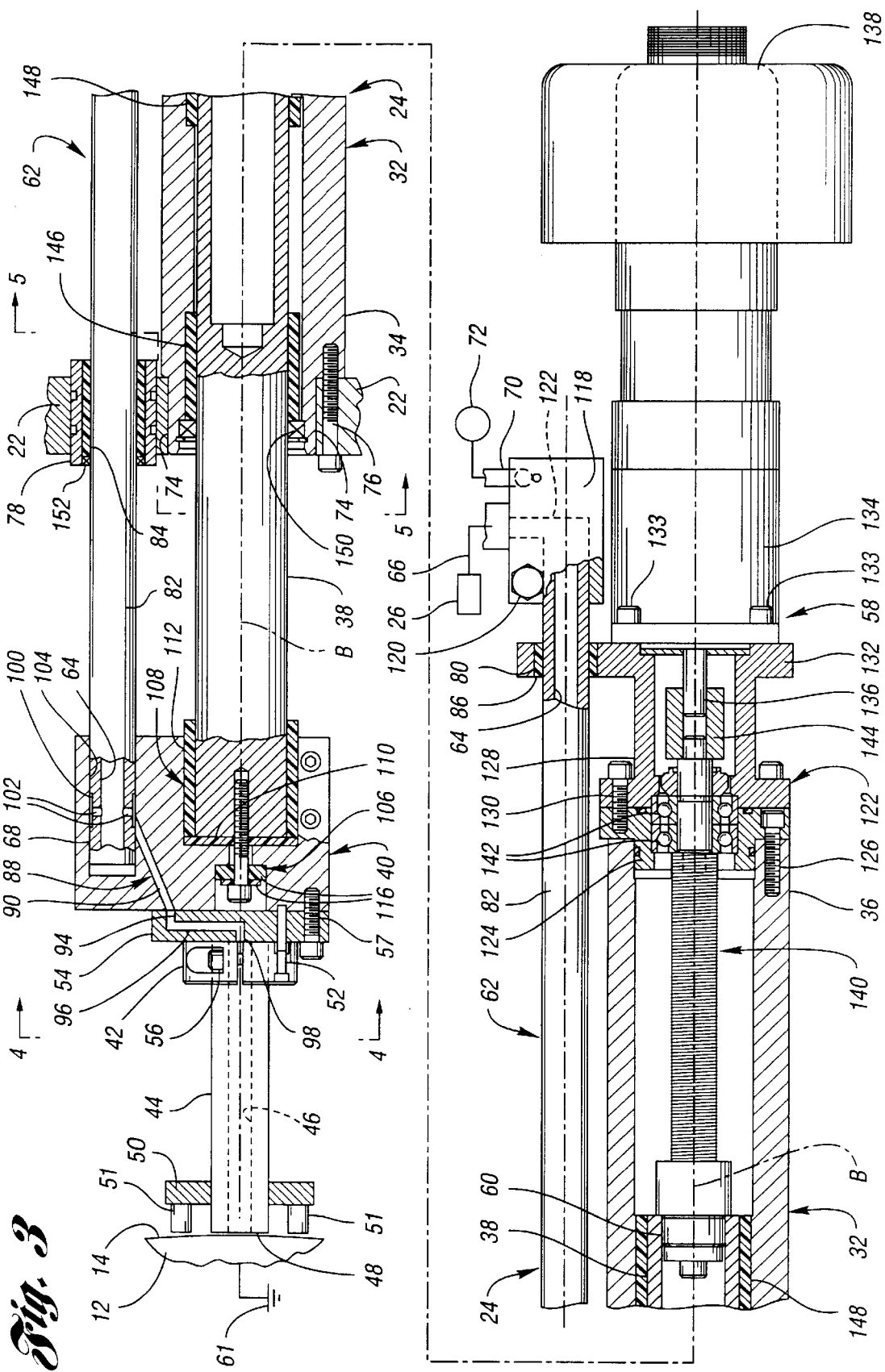
FIG. 3 is a longitudinal view taken partially in section through one of the electrode positioners.

As illustrated in FIG. 3, the electrode positioner 24 of the invention includes an elongated housing 32 of a generally tubular shape having first and second ends 34 and 36. A slide 38 of the electrode positioner is mounted within the housing 32 for movement along a slide axis B in a direction that is toward and away from the surface 14 of the workpiece 12 in a generally perpendicular relationship. The slide 38 has a servo head 40 supported thereby at the first end 34 of the housing 32. This servo head 40 includes an electrode holder 42 for holding an electrode 44 which includes a central passage 46 through which dielectric fluid is supplied to its distal end 48 that is located adjacent the workpiece surface 14 where the sparking is provided to perform the electric-discharge texturing. A brush 50 having bristles 51 is mounted on the electrode end 48 to help in confining the dielectric fluid around the electrode and thereby facilitate the sparking operation. The electrode holder 42, as shown in FIG. 4, is a split ring construction and is mounted by bolts 52 on an anvil 54 of the servo head. Also, circumferentially spaced bolts 57 mount the anvil 54 on the servo head. A tightening bolt 56 opens and closes the split ring construction of the holder 42 to clamp and unclamp the electrode 44 such that it can be replaced when necessary.

With reference back to FIG. 3, the electrode positioner 24 also includes a servo actuator 58 mounted by the housing 32 adjacent the second end 36 of the housing. This servo actuator 58 has a connection 60 to the slide 38 and is operable to move the slide and the servo head 40 with the electrode 44 supported thereby along the slide axis B toward and away from the workpiece surface 14 which is electrically grounded as shown at 61. This movement through any suitable type of voltage detection is coordinated so that there is the proper spacing between the electrode end 48 and the workpiece surface 14 to ensure proper sparking through the dielectric fluid for performing the material removal from the workpiece surface and the resultant texturing operation.

With continuing reference to FIG. 3, the electrode positioner 24 includes an elongated connector 62 that is located externally of the housing 32 and extends from the servo head 40 at the first end 34 of the housing to the second end 36 of the housing in a parallel relationship to the slide axis A. The elongated connector 62 has an internal passage 64 for carrying dielectric fluid to the servo head 46 at the first end 34 of housing 32 from the dielectric fluid supply 26 through a conduit 66 adjacent the second end 36 of the housing 32. Furthermore, the elongated connector 62 has an electrical connection 68 to the servo head 40 at the first end 34 of the housing 32 and also has an electrical connection 70 for connecting to an electrical power supply 72 adjacent the second end 36 of the housing 32 to supply electrical power to the electrode 44 supported by the electrode holder 42 on the servo head 40. The construction of the electrode holder 24 is economically effective by the provision of the elongated connector 62 that both supplies the dielectric fluid and the electrical power to the electrode 44 externally of the housing 32. The power supply 72 provides a pulsating direct current that may be either of a positive or negative charge.

Figure 5:
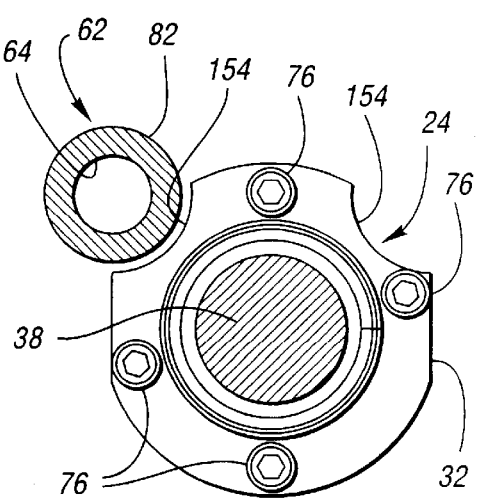
FIG. 5 is an end view taken partially in section through the electrode positioner along the direction of line 5—5 in FIG. 3.

With continuing reference to FIG. 3, the first end 34 of the housing 32 includes a mounting surface 74 for mounting the electrode positioner 24 on the electrical-discharge texturing apparatus at the housing 22 that is supported by the carriage on the slideway as previously described. This mounting surface 74 as illustrated has a generally annular shape with securement being provided as also shown in FIG. 5 by a plurality of bolts 76. The housing 22 of the apparatus also mounts a first bushing 78 for supporting the elongated connector 62 on the apparatus adjacent the first end 34 of the housing 32 for movement with respect to the housing while preventing rotation of the servo head 40 with respect to the housing about the slide axis. The electrode positioner also includes a second bushing 80 for supporting the elongated connector 62 on the second end 36 of the housing 32 for movement with respect to the housing while preventing rotation of the servo head 40 with respect to the housing about the slide axis. The first and second bushings 78 and 80 thus cooperatively prevent rotation of the servo head 40 with respect to the housing 32 about the slide axis B.

As illustrated by continuing reference to FIG. 3, the elongated connector 62 includes an elongated metallic tube 82 having an interior that defines the passage 64 that carries the dielectric fluid to the servo head 40. This elongated metallic tube 82 also carries the electrical power between the electrical connections 68 and 70 to the servo head 40 and the electrical power supply 72, respectively. This construction of the elongated connector 62 with the metallic tube 82 providing both the fluid conduit and the path for transmitting electrical power is preferable over other constructions such as, for example, a plastic tube for carrying the dielectric fluid within its interior and receiving an electrical connector that extends between the electrical connections to the servo head and the electrical power supply. Furthermore, the first and second bushings 78 and 80 are electrically insulated by associated annular electrical insulators 84 and 86, respectively, so that the housing 22 of the apparatus and the housing 32 of the electrode positioner are not electrically energized. The electrically insulated bushings 78 and 80 thus both support the elongated metallic tube 82 of the connector 62 for movement on the housing 22 of the apparatus and with respect to the housing 32 of the electrode positioner as well as preventing rotation of the servo head 40 about the slide axis B.

As illustrated in the upper left portion of FIG. 3, the servo head 40 includes a passageway 88 for carrying the dielectric fluid from the interior passage 64 of the elongated metallic tube 82 to the passage 46 of the electrode 44. More specifically, this passageway 88 includes a passage 90 in an arm 92 extending as shown in FIG. 4 radially with respect to the slide axis B to the elongated connector 62 and its elongated metallic tube 82. Passageway 88 also extends through the anvil 54 as shown in FIG. 3 where it includes an axial passage 94 communicated with the arm passage 90, a radial passage 96 extending toward the slide axis B from the axial passage 94, and another axial passage 98 that connects the passage 96 with the passage 46 in the electrode 44. Adjacent the servo head 40, the elongated metallic tube 82 has an annular passage 100 that is fed by radial passages 102 to communicate the interior passage 64 with the passage 90 of the passageway 88. The servo head 40 at its arm 92 shown in FIG. 4 has a bore 104 that receives the adjacent end of the elongated metallic tube 82 so as to provide the electrical connection thereof with the servo head. Engagement of the anvil 54 with the servo head 40 and engagement of the electrode holder 42 with the anvil as well as the engagement of the electrode holder with the electrode 44 provides a path of electrical continuity to the electrode so as to be electrically energized for the electric-discharge texturing operation.

The electrode positioner 24 shown in FIG. 3 also includes an electrically insulated connection 106 that connects the servo head 40 to the slide 38 while electrically isolating these components from each other. More specifically, the electrically insulated connection 106 includes a cup-shaped insulator 108 that includes a disk portion 110 and an annular portion 112. A bolt 114 of the electrically insulated connection has its head seated by insulators 116 and extends for threading into the slide 38 without electrically contacting the servo head 40. The attachment of the electrically insulated connection 106 is done before the anvil 54 is secured to the servo head 40 so as to permit access for making this connection.

As illustrated by the lower portion of FIG. 3, the electrode positioner 24 also includes a metallic connector block 118 that is mounted by the elongated metallic tube 82 of the elongated connector 62 adjacent the second end 36 of the housing 32. This connector block 118 has a clamp construction that is secured by a bolt 120 to provide clamping thereof on the adjacent end of the elongated metallic tube 82 of the elongated connector 62. Connector block 118 is metallic and embodies the connector 70 for electrically connecting the elongated metallic tube 82 to the electrical power source 72. In addition, the connector block 118 includes a passageway 122 for fluid connection through the conduit 66 to the dielectric fluid supply 26 and for providing communication thereof with the passage 64 defined by the interior of the elongated metallic tube 82 in order to provide the dielectric fluid supply to the electrode as previously described.

With continuing reference to the lower portion of FIG. 3, the second end 36 of housing 32 includes a housing extension 122 that includes a first extension portion 124 secured to the housing end by a plurality of circumferentially spaced bolts 126, only one of which is shown. A second extension portion 128 of the housing extension 122 is secured to the first extension portion 124 by a plurality of circumferentially spaced bolts 130, only one of which is shown. This second extension portion 128 extends toward the right and has a motor mount 132 of a generally annular shape.

With continuing reference to FIG. 3, the servo actuator 58 includes an electric servo motor 134 mounted by the motor mount 132 of the housing extension 122 and secured thereto by bolts 133. The electric servo motor 34 has a rotary output 136 and includes an electrical connector 138 for providing electrical power and control of its operation for controlling the rotational driving of the rotary output. The servo actuator 58 also includes a ball screw and nut assembly 140 that is rotatively driven by the rotary output 136 of the servo motor 134 and is connected by the connection 60 as previously described to the slide 38 to provide the movement of the slide along the slide axis B. The ball screw and nut assembly 140 is located within the housing extension 122 that is mounted on the second end 36 of housing 32. A rotational coupling 144 rotatively connects the rotary output 136 of the electric servo motor 134 with the ball screw and nut assembly 140 adjacent the antifriction bushings 142. Rotational driving of the coupling 144 by the electric servo motor 134 causes the ball screw and nut assembly 140 to move the slide 38 along the slide axis B to provide the movement of the servo head 40 and the electrode supported thereby toward and away from the workpiece surface 14 as previously described.

During the movement of the slide 38 under the operation of the electric servo motor 134 as described above in connection with FIG. 3, a pair of plastic bushings 146 and 148 support the slide on the housing 32. Furthermore, an annular seal 150 extending between the slide 38 and the second end 34 of the housing 32 prevents the dielectric fluid from entering the housing. Likewise, the insulated bushing 78 also has an annular seal 152 that prevents the dielectric fluid from contacting its insulator 84. As illustrated in FIG. 5, the housing 32 includes a pair of elongated channels 154, one of which receives the elongated metallic tube 82 of the elongated connector 62 and the other of which will receive the elongated metallic tube of the elongated connector of an adjacent electrode positioner such that the construction facilitates close spacing of the electrode positioners to each other.

While the best mode for carrying out the invention has been described in detail, those familiar with the art to which this invention relates will recognize alternative designs and embodiments for practicing the invention as defined by the following claims.

What is claimed is:

1. An electrode positioner for electric-discharge texturing apparatus for performing texturing of a workpiece surface, comprising:

an elongated housing of a generally tubular construction having first and second ends;

a slide mounted by the housing for movement along a slide axis extending along the housing, the slide having a servo head supported thereby at the first end of the housing, and the servo head including an electrode holder for holding an electrode used in the electric-discharge texturing of the workpiece surface;

a servo actuator mounted by the housing adjacent the second end of the housing and operable to move the slide and the servo head with the electrode supported thereby along the slide axis toward and away from the workpiece surface; and an elongated connector located externally of the housing and extending from the servo head at the first end of the housing to the second end of the housing in a parallel relationship to the slide axis, the elongated connector having an internal passage for carrying dielectric fluid to the servo head at the first end of the housing from a dielectric fluid supply adjacent the second end of the housing, and the elongated connector having an electrical connection to the servo head at the first end of the housing and an electrical connection for connecting to an electrical power supply adjacent the second end of the housing to supply electrical power to the electrode supported by the electrode holder on the servo head.

2. An electrode positioner for electric-discharge texturing apparatus as in claim 1 wherein the first end of the housing includes a mounting surface for mounting the electrode positioner on the apparatus, and further including a bushing for supporting the elongated connector on the apparatus adjacent the first end of the housing for movement with respect to the housing while preventing rotation of the servo head with respect to the housing about the slide axis.

3. An electrode positioner for electric-discharge texturing apparatus as in claim 2 wherein the first end of the housing includes a mounting surface for mounting the electrode positioner on the apparatus, and further including a bushing for supporting the elongated connector on the second end of the housing for movement with respect to the housing while preventing rotation of the servo head with respect to the housing about the slide axis.

4. An electrode positioner for electric-discharge texturing apparatus as in claim 2 wherein the first end of the housing includes a mounting surface for mounting the electrode positioner on the apparatus, a first bushing for supporting the elongated connector on the apparatus adjacent the first end of the housing for movement with respect to the housing, a second bushing for supporting the elongated connector on the second end of the housing for movement with respect to the housing, and the first and second bushings cooperatively preventing rotation of the servo head with respect to the housing about the slide axis.

5. An electrode positioner for electric-discharge texturing apparatus as in claim 1 wherein the elongated connector includes an elongated metallic tube having an interior that defines the passage that carries the dielectric fluid to the servo head, and the elongated metallic tube carrying the electrical power between the electrical connections to the servo head and the electrical power supply.

6. An electrode positioner for electric-discharge texturing apparatus as in claim 5 wherein the first end of the housing includes a mounting surface for mounting the electrode positioner on the apparatus, and further including an electrically insulated bushing for supporting the elongated metallic tube of the elongated connector on the apparatus adjacent the first end of the housing for movement with respect to the housing while preventing rotation of the servo head with respect to the housing about the slide axis.

7. An electrode positioner for electric-discharge texturing apparatus as in claim 5 wherein the first end of the housing surface includes a mounting surface for mounting the electrode positioner on the apparatus, and further including an electrically insulated bushing for supporting the elongated metallic tube of the elongated connector on the second end of the housing for movement with respect to the housing while preventing rotation of the servo head with respect to the housing about the slide axis.

8. An electrode positioner for electric-discharge texturing apparatus as in claim 5 wherein the first end of the housing includes a mounting surface for mounting the electrode positioner on the apparatus, a first electrically insulated bushing for supporting the elongated metallic tube of the elongated connector on the apparatus adjacent the first end of the housing for movement with respect to the housing, a second electrically insulated bushing for supporting the elongated connector on the second end of the housing for movement with respect to the housing, and the first and second electrically insulated bushings cooperatively preventing rotation of the servo head with respect to the housing about the slide axis.

9. An electrode positioner for electric-discharge texturing apparatus as in claim 5 wherein the servo head includes a passageway for carrying the dielectric fluid from the interior of the elongated metallic tube to the electrode supported by the electrode holder.

10. An electrode positioner for electric-discharge texturing apparatus as in claim 9 further including an electrically insulated connection that connects the servo head to the slide.

11. An electrode positioner for electric-discharge texturing apparatus as in claim 5 further including a metallic connector block that is mounted by the elongated metallic tube of the elongated connector adjacent the second end of the housing and has an electrical connection for electrically connecting to the electrical power source and also has a passageway for fluid connection to the dielectric fluid supply.

12. An electrode positioner for electric-discharge texturing apparatus as in claim 1 wherein the servo actuator includes an electric servo motor having a rotary output that rotates about the slide axis, and the servo actuator including a ball screw and nut assembly rotatively driven by the rotary output of the electric servo motor and connected to the slide to provide the movement of the slide along the slide axis.

13. An electrode positioner for electric-discharge texturing apparatus for performing texturing of a workpiece surface, comprising:

an elongated housing of a generally tubular construction having first and second ends, and the first end of the housing having a mounting surface for mounting the electrode positioner on the apparatus;

a slide mounted by the housing for movement along a slide axis extending along the housing, the slide having a servo head supported thereby at the first end of the housing, and the servo head including an electrode holder for holding an electrode used in the electric-discharge texturing of the workpiece surface;

a servo actuator mounted by the housing adjacent the second end of the housing and operable to move the slide and the servo head with the electrode supported thereby along the slide axis toward and away from the workpiece surface;

an elongated connector located externally of the housing and extending from the servo head at the first end of the housing to the second end of the housing in a parallel relationship to the slide axis, the elongated connector including an elongated metallic tube having an interior defining an internal passage for carrying dielectric fluid to the servo head at the first end of the housing from a dielectric fluid supply adjacent the second end of the housing, and the elongated metallic tube having an electrical connection to the servo head at the first end of the housing and an electrical connection for connecting to an electrical power supply adjacent the second end of the housing to supply electrical power to the electrode supported by the electrode holder on the servo head; and a first electrically insulated bushing for supporting the elongated metallic tube of the elongated connector on the apparatus adjacent the first end of the housing for movement with respect to the housing, a second electrically insulated bushing for supporting the elongated metallic tube of the elongated connector on the second end of the housing for movement with respect to the housing, and the first and second electrically insulated bushings cooperatively preventing rotation of the servo head with respect to the housing about the slide axis.

14. An electrode positioner for electric-discharge texturing apparatus for performing texturing of a workpiece surface, comprising:

an elongated housing of a generally tubular construction having first and second ends, and the first end of the housing having a mounting surface for mounting the electrode positioner on the apparatus;

a slide mounted by the housing for movement along a slide axis extending along the housing, the slide having a servo head supported thereby at the first end of the housing, an insulated connector that connects the servo head to the slide, and the servo head including an electrode holder for holding an electrode used in the electric-discharge texturing of the workpiece surface;

a servo actuator mounted by the housing adjacent the second end of the housing and including an electric servo motor having a rotary output that rotates about the slide axis, and the servo actuator including a ball screw and nut assembly rotatively driven by the rotary output of the electric servo motor and connected to the slide to provide the movement thereof and the servo head along the slide axis toward and away from the workpiece surface;

an elongated connector located externally of the housing and extending from the servo head at the first end of the housing to the second end of the housing in a parallel relationship to the slide axis, the elongated connector including an elongated metallic tube having an interior defining an internal passage for carrying dielectric fluid to the servo head at the first end of the housing from a dielectric fluid supply adjacent the second end of the housing, and the elongated metallic tube having an electrical connection to the servo head at the first end of the housing and an electrical connection for connecting to an electrical power supply adjacent the second end of the housing to supply electrical power to the electrode supported by the electrode holder on the servo head; and a first electrically insulated bushing for supporting the elongated metallic tube of the elongated connector on the apparatus adjacent the first end of the housing for movement with respect to the housing, a second electrically insulated bushing for supporting the elongated metallic tube of the elongated connector on the second end of the housing for movement with respect to the housing, and the first and second electrically insulated bushings cooperatively preventing rotation of the servo head with respect to the housing about the slide axis.

* * * * *